United States Patent
Fors et al.

(10) Patent No.: US 9,176,846 B1
(45) Date of Patent: *Nov. 3, 2015

(54) VALIDATING CORRECTNESS OF EXPRESSION EVALUATION WITHIN A DEBUGGER

(71) Applicant: International Business Machines Corporation, Armonk, NY (US)

(72) Inventors: Timothy A. Fors, Uxbridge (CA); Patrick G. Gallop, North York (CA); Chung Hang Kevin Yuen, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/597,469

(22) Filed: Jan. 15, 2015

Related U.S. Application Data

(63) Continuation of application No. 14/280,749, filed on May 19, 2014.

(51) Int. Cl.
 *G06F 9/44* (2006.01)
 *G06F 11/36* (2006.01)
(52) U.S. Cl.
 CPC ........ *G06F 11/3624* (2013.01); *G06F 11/3688* (2013.01); *G06F 11/3692* (2013.01)
(58) Field of Classification Search
 CPC .............. G06F 11/362; G06F 11/3664; G06F 11/3636; G06F 11/3624; G06F 11/3688; G06F 11/3692; G06F 8/20; G06F 8/30
See application file for complete search history.

(56) References Cited

U.S. PATENT DOCUMENTS

| | | | |
|---|---|---|---|
| 5,815,714 A | 9/1998 | Shridhar et al. | |
| 6,874,140 B1* | 3/2005 | Shupak | 717/131 |
| 6,938,239 B2* | 8/2005 | McDermott et al. | 717/100 |
| 7,086,033 B2 | 8/2006 | Bates et al. | |
| 7,134,115 B2 | 11/2006 | Kawai et al. | |
| 7,607,123 B2 | 10/2009 | Chavan | |
| 8,146,061 B2 | 3/2012 | Xu et al. | |
| 8,332,641 B2* | 12/2012 | Case et al. | 713/168 |
| 8,739,139 B2 | 5/2014 | Miyoshi | |
| 8,880,952 B1 | 11/2014 | Labonte et al. | |

(Continued)

OTHER PUBLICATIONS

Dimitrov et al., Anomaly-based bug prediction, isolation, and validation: an automated approach for software debugging, Feb. 2009, 12 pages.*
U.S. Appl. No. 14/280,749, filed May 19, 2014; Entitled "Validating Correctness of Expression Evaluation Within a Debugger".
List of IBM Patents or Patent Applications Treated as Related.

(Continued)

*Primary Examiner* — Thuy Dao
(74) *Attorney, Agent, or Firm* — Alexa L. Ashworth

(57) ABSTRACT

A method for validating correctness of expression evaluation within a debugger. The method includes determining a statement of interest comprising an expression recognized by a debugger program within one or more source program files of a debuggable program and generating a debug command file for the statement of interest. The method includes inserting a set of debug commands, comprising a first path for a baseline run and a second path for a test run for the statement of interest, into the debug command file, then causing the execution of the baseline run and test run. Results from the baseline run and results from the test run are compared to determine if the results from the baseline run are equivalent to the results from the test run.

7 Claims, 11 Drawing Sheets

(56) References Cited

U.S. PATENT DOCUMENTS

| | | | |
|---|---|---|---|
| 2006/0064676 A1 | 3/2006 | Chavan | |
| 2007/0226681 A1* | 9/2007 | Thorup | 717/104 |
| 2008/0184206 A1 | 7/2008 | Vikutan | |
| 2010/0251213 A1* | 9/2010 | Yamin | 717/124 |
| 2011/0061042 A1 | 3/2011 | Deshmukh et al. | |
| 2012/0331449 A1 | 12/2012 | Farchi et al. | |
| 2013/0007718 A1 | 1/2013 | Bates | |

OTHER PUBLICATIONS

Adler et al.; "Facilitating Timing Debug by Logic Path Correspondence"; Mar. 2014; pp. 1-6; EDAA.

Keng et al.; "Path Directed Abstraction and Refinement in SAT-Based Design Debugging"; DAC 2012; Jun. 3-7, 2012; pp. 947-954; ACM; San Francisco, CA.

* cited by examiner

```
EXAMPLE COBOL SOURCE PROGRAM FILE

IDENTIFICATION DIVISION.
   PROGRAM-ID SAMPLE.

DATA DIVISION.
   WORKING-STORAGE SECTION.
   1 X USAGE COMP-3 PIC 999.
   1 REC.
     5 ARR USAGE BINARY PIC 999 OCCURS 3.
   1 PTR POINTER.

PROCEDURE DIVISION.
      MOVE 44 TO ARR(2)

COMPUTE X = ARR(2) * 10 + 4

ADD X ARR(2) GIVING ARR(1)

SET PTR TO ADDRESS OF X

IF RETURN-CODE = 0 THEN
         DISPLAY "THIS IS THE TRUE PATH"
      ELSE
         DISPLAY "THIS IS THE FALSE PATH"
      END-IF

STOP RUN.
   END PROGRAM SAMPLE.
```

FIG. 5A

```
EXAMPLE DEBUG COMMAND FILE FOR MOVE, COMPUTE, ADD, AND SET COMMANDS

COMMENT 1 IS FOR BASE RUN, 2 IS FOR TEST RUN ;       IF DTTESTRUNID = 2
                                                       BEGIN ;
IF DTTESTRUNID = 2                                       COMMENT SET BREAKPOINT TO SKIP LINE 16: ;
  BEGIN ;                                                COMMENT ADD X ARR(2) GIVING ARR(1) ;
    COMMENT SET BREAKPOINT TO SKIP LINE 12: ;          AT 16
    COMMENT MOVE 44 TO ARR(2) ;                          BEGIN ;
    AT 12                                                  COMPUTE ARR ( 1 ) = X + ARR ( 2 ) ;
      BEGIN ;                                              LIST ( ARR ( 1 ) ) ;
        MOVE 44 TO ARR ( 2 ) ;                             LIST ( %HEX ( ARR ( 1 ) ) ) ;
        LIST ( ARR ( 2 ) ) ;                               GOTO 18 ;
        LIST ( %HEX ( ARR ( 2 ) ) ) ;                    END ;
        GOTO 14 ;                                      END ;
      END ;                                          ELSE
  END ;                                                BEGIN ;
ELSE                                                     COMMENT SET BREAKPOINT JUST AFTER LINE 16: ;
  BEGIN ;                                                COMMENT ADD X ARR(2) GIVING ARR(1) ;
    COMMENT SET BREAKPOINT JUST AFTER LINE 12: ;       AT 18
    COMMENT MOVE 44 TO ARR(2) ;                          BEGIN ;
    AT 14                                                  LIST ( ARR ( 1 ) ) ;
      BEGIN ;                                              LIST ( %HEX ( ARR ( 1 ) ) ) ;
        LIST ( ARR ( 2 ) ) ;                             END ;
        LIST ( %HEX ( ARR ( 2 ) ) ) ;                  END ;
      END ;                                          END-IF ;
  END ;
END-IF ;                                             IF DTTESTRUNID = 2
                                                       BEGIN ;
IF DTTESTRUNID = 2                                       COMMENT SET BREAKPOINT TO SKIP LINE 18: ;
  BEGIN ;                                                COMMENT SET PTR TO ADDRESS OF X ;
    COMMENT SET BREAKPOINT TO SKIP LINE 14: ;          AT 18
    COMMENT COMPUTE X = ARR(2) * 10 + 4 ;                BEGIN ;
    AT 14                                                  SET PTR TO ADDRESS OF X ;
      BEGIN ;                                              LIST ( PTR ) ;
        COMPUTE X = ARR ( 2 ) * 10 + 4 ;                   LIST ( %HEX ( PTR ) ) ;
        LIST ( X ) ;                                       GOTO 20 ;
        LIST ( %HEX ( X ) ) ;                            END ;
        GOTO 16 ;                                      END ;
      END ;                                          ELSE
  END ;                                                BEGIN ;
ELSE                                                     COMMENT SET BREAKPOINT JUST AFTER LINE 18: ;
  BEGIN ;                                                COMMENT SET PTR TO ADDRESS OF X ;
    COMMENT SET BREAKPOINT JUST AFTER LINE 14: ;       AT 20
    COMMENT COMPUTE X = ARR(2) * 10 + 4 ;                BEGIN ;
    AT 16                                                  LIST ( PTR ) ;
      BEGIN ;                                              LIST ( %HEX ( PTR ) ) ;
        LIST ( X ) ;                                     END ;
        LIST ( %HEX ( X ) ) ;                          END ;
      END ;                                          END-IF ;
  END ;
END-IF ;                                             AT EXIT %CU
                                                       QUIT ;
```

FIG. 5B

EXAMPLE DEBUG LOG FILES FOR MOVE, COMPUTE, ADD, AND SET COMMANDS

| | |
|---|---|
| * 05 ARR(2) = 00044 | * 05 ARR(2) = 00044 |
| * 05 ARR(2) = X'002C' | * 05 ARR(2) = X'002C' |
| * X = 444 | * X = 444 |
| * X = X'444F' | * X = X'444F' |
| * 05 ARR(1) = 00488 | * 05 ARR(1) = 00488 |
| * 05 ARR(1) = X'01E8' | * 05 ARR(1) = X'01E8' |
| * PTR = X'273B25C0' | * PTR = X'273B25C0' |
| * PTR = X'273B25C0' | * PTR = X'273B25C0' |
| BASELINE RUN | TEST RUN |

FIG. 5C

```
EXAMPLE DEBUG COMMAND FILE FOR IF COMMAND

COMMENT 1 is for base run, 2 is for test run ;

IF DTTESTRUNID = 2
   BEGIN ;
      COMMENT Set breakpoint before IF block at line 20: ;
      COMMENT IF RETURN-CODE = 0 THEN ;
      AT 20
        BEGIN ;
          IF RETURN-CODE = 0 THEN
            LIST "IFPATH on line 20" ;
          ELSE
            LIST "ELSEPATH on line 22" ;
          END-IF ;
        END ;
   END ;
ELSE
   BEGIN ;
      COMMENT Set breakpoint just after line 20: ;
      COMMENT IF RETURN-CODE = 0 THEN ;
      AT 21
        BEGIN ;
          LIST "IFPATH on line 20" ;
        END ;
      COMMENT Set breakpoint just after line 22: ;
      COMMENT ELSE ;
      AT 23
        BEGIN ;
          LIST "ELSEPATH on line 22" ;
        END ;
   END ;
END-IF ;
AT EXIT %CU
   QUIT ;
```

FIG. 5D

```
EXAMPLE DEBUG LOG FILES FOR IF COMMAND

* IFPATH on line 20              * IFPATH on line 20

BASELINE RUN                     TEST RUN
```

FIG. 5E

VALIDATING CORRECTNESS OF EXPRESSION EVALUATION WITHIN A DEBUGGER

FIELD OF THE INVENTION

The present invention relates generally to the field of testing program code, and more particularly to validating correctness of expression evaluation within a debugger.

BACKGROUND

A software program includes the data and functions of that program which are defined in a source code. The source code contains all of the programming statements written in a particular programming language. Compilers are tools that read the source code, and subsequently create computer-executable output files, usually called object files. These output files are in a format that can be read by the computer, and cause the computer to perform the indicated tasks.

Debuggers are computer programs that allow computer program developers to find errors in software programs. One method of detecting errors is to stop the execution of a computer program at predetermined points, or breakpoints. Debuggers may also allow the user to restart a program, track the values of the variables, execute a single-step running of a program, and set specific conditions under which the program execution should be interrupted and control given to the debugger, among other functions.

Debuggers also often support the evaluation of high level language expressions as defined by the programming language and supported by the compiler. The results of the expression evaluation in the debugger should be identical to the results that are obtained by executing the compiler-generated code for the same expression. Compilers may encode debugging information in the object code or in a separate file which, once loaded into a computer memory, may be used to map source variables to their locations in memory, determine variable types, and map source statements to the compiler-generated instructions in memory.

SUMMARY

Embodiments of the present invention disclose a method, computer program product, and computer system for validating correctness of expression evaluation within a debugger. A computing device determines a statement of interest comprising an expression recognized by a debugger program, within one or more source program files of a debuggable program. The computing device generates a debug command file for the statement of interest. The computing device inserts a set of debug commands, comprising a first path for a baseline run and a second path for a test run, for the statement of interest, into the debug command file. The computing device also causes the execution of the baseline run and test run. The computing device further compares results from the baseline run and results from the test run to determine if the results from the baseline run are equivalent to the results from the test run.

BRIEF DESCRIPTION OF THE SEVERAL VIEWS OF THE DRAWINGS

FIG. 5A illustrates example text of a COBOL source program file containing the statements of interest, MOVE, COMPUTE, ADD, SET, and IF, in accordance with an embodiment of the present invention.

FIG. 5B illustrates example text of a debug command file, generated from the COBOL source program file in FIG. 5A, for validating the correctness of the MOVE, COMPUTE, ADD, and SET commands in a debugger, in accordance with an embodiment of the present invention.

FIG. 5C illustrates example text of a debug log file produced from a baseline run and a test run for the statements of interest MOVE, COMPUTE, ADD, and SET, in accordance with an embodiment of the present invention.

FIG. 5D illustrates example text of a debug command file, generated from the COBOL source program file in FIG. 5A, for validating the correctness of the IF command in a debugger, in accordance with an embodiment of the present invention.

FIG. 5E illustrates example text of a debug log file, produced from a baseline run and a test run for the statement of interest IF, in accordance with an embodiment of the present invention.

DETAILED DESCRIPTION

Debuggers are an important element in the development of a computer program, and it is critical that the debugger is functioning properly to help pinpoint any problems or errors in the program code being developed.

The present invention involves a method to help ensure that the debugger is functioning properly. The evaluation of high level language expressions takes place twice, once by executing the compiler-generated code for those expressions (under control of the debugger), and once by executing equivalent commands supported by the command language of the debugger. The output of each evaluation is compared to determine whether the same results are obtained, indicating that the debugger is functioning properly.

This process helps to overcome the difficulties in validating consistencies of the evaluation of expressions between a compiler and a debugger, as compilers and debuggers are often each implemented by different development teams or individuals, and each tested using various tools and methodologies. Further, expression evaluation is a complex process wherein a potentially large number of language rules must be followed very precisely, and the complexity increases as more operators and data types are supported by a language. When the types are intermixed within an expression, there are rules that must be followed regarding type conversion, decimal point alignment, truncation, and sign correctness, among others. Despite the efforts of organizations to produce standards for defining programming languages, such as the American National Standards Institute (ANSI) and the International Organization for Standardization (ISO), these rules are sometimes subtle and open to interpretation. As a result, there is the potential for the debugger to yield different expression evaluation results than the expression evaluation results of the compiler-generated code, and it is difficult to detect where the discrepancies exist so that they can be resolved.

Figure 1:
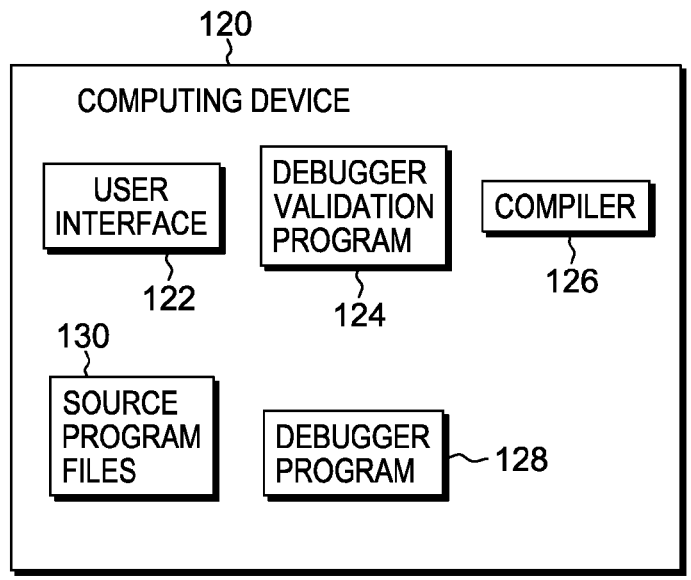
FIG. 1 is a functional block diagram illustrating a computing device, in accordance with an embodiment of the present invention.

The present invention will now be described in detail with reference to the Figures. FIG. 1 is a functional block diagram illustrating a computing device, designated 120, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

In various embodiments of the present invention, computing device 120 can be a laptop computer, a tablet computer, a netbook computer, a personal computer (PC), a desktop computer, a personal digital assistant (PDA), a smart phone, or any programmable electronic device capable of executing computer readable program instructions. Computing device 120 can be a server including a management server, a web server, or any other electronic device or computing system capable of receiving and sending data.

Computing device 120 includes user interface (UI) 122, debugger validation program 124, compiler 126, debugger program 128, and source program files 130. In various embodiments of the present invention, one or more of debugger validation program 124, compiler 126, debugger program 128, and source program files 130 could be included within one program. Computing device 120 may include internal and external components, as depicted and described in further detail with respect to FIG. 6.

UI 122 may be, for example, a graphical user interface (GUI) or a web user interface (WUI), and can display text, documents, web browser windows, user options, application interfaces, and instructions for operation.

Source program files 130 are one or more computer language files, and may include expressions that perform assignment, arithmetic, and comparison, among other functions. In an embodiment of the present invention, source program files 130 are written in Common Business-Oriented Language (COBOL) programming language. In other embodiments of the present invention, source program files 130 may be a source program file(s) written in any suitable programming language.

Compiler 126 is a set of computer readable program instructions that operates to transform source program files 130 written in a programming language into a computer executable language, or a computer code. In an illustrative embodiment of the present invention, the compiler-generated computer code evaluates high level language expressions, such as assignment, arithmetic, and comparison, among other expressions.

Debugger program 128 operates to control the execution of a debuggable program and examine the state of the debuggable program in a variety of ways. Debugger program 128 allows a user to set breakpoints, step through a set of program statements, jump around a set of program statements, examine variables, and evaluate expressions, among other functions. In an embodiment in accordance with the present invention, debugger program 128 supports automated program execution, so that a program may run solely under debug control using a series of scripted debug commands. As a debug command file is executed by debugger program 128, the debug command file output is saved in a log file.

Debugger validation program 124 operates generally to ensure that the expression evaluation performed by debugger program 128 is correct. Debugger validation program 124 validates consistency between complex expression evaluation performed by the compiler-generated code and debugger program 128 involving arithmetic operators, logical operators, assignment, subscripting, member access, and literal values, among other evaluations. Debugger validation program 124 scans source program files 130, and causes the execution of a validation method involving the compiler-generated code and debugger program 128. In an example embodiment in accordance with the present invention, debugger validation program 124 and debugger program 128 are stored on different devices and interact with each other via a network.

Figure 2:
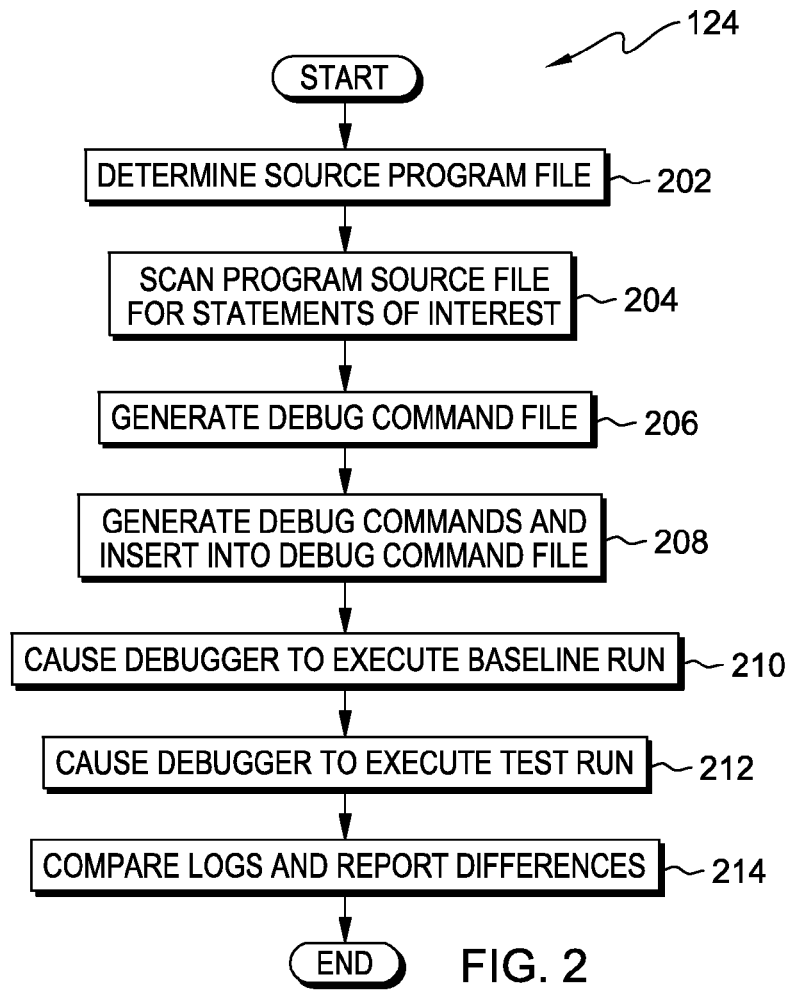
FIG. 2 is a flowchart depicting operational steps of a debugger validation program for validating the correctness of expression evaluation within a debugger, in accordance with an embodiment of the present invention.

FIG. 2 is a flowchart depicting operational steps of debugger validation program 124 for validating the correctness of expression evaluation within a debugger, in accordance with an embodiment of the present invention.

Debugger validation program 124 determines a source program file to scan (step 202). A user chooses a source program file, the program files that define the data and the statements, for debugger validation program 124 to scan. In one embodiment, COBOL language source files are the source program files chosen by a user. In another embodiment, the program source files chosen by the user may be written in any suitable programming language so that debugger validation program 124 can scan the program source files in order to validate debugger program 128 support in evaluating expressions from the chosen programming language.

Source files that were originally written to test the compiler (i.e., a compiler test suite) could be reused here to also test the debugger. Such a compiler test suite would already have a comprehensive set of test cases, which validate support of the compiler for all of the expression types allowed by a programming language. The compiler test suite is ideal for similarly testing the support of the debugger for expression evaluation using a program methodology, in accordance with an embodiment of present invention. Every kind of expression and every combination of data types that are covered by the compiler test cases (everything allowed by the programming language) will also be tested in the debugger, and if the debugger and compiler-generated code each comes up with a different answer for any of the expressions, this will be detected and flagged as an issue that needs to be resolved.

Debugger validation program 124 scans source program files 130 for a program statement of interest, which is a program statement that contains an expression of interest (step 204). In one embodiment, an expression is of interest if it is supported by expression evaluation within debugger program 128. For example, debugger validation program 124 is written in Perl programming language and uses pattern matching with regular expressions to discover statements of interest within a COBOL source file. The statements MOVE, SET, COMPUTE, and IF are statements of interest in COBOL language source files because debugger program 128 supports commands which mimic these COBOL statements.

A COBOL program may also contain additional statements such as ADD, SUBTRACT, MULTIPLY, and DIVIDE, which perform arithmetic, similar to the COMPUTE statement. Debugger validation program 124 can detect the additional statements in the source files and convert the additional statements into the equivalent COMPUTE commands in the debug command file. The conversion of the additional statements into a COMPUTE command preserves the semantics, though the debugger may not support a command with the same name and syntax as the additional statement. This allows the additional statements to also be considered statements of interest, and be leveraged as additional input to the debugger validation process. FIG. 5A depicts an example of a COBOL source program file containing the statements of interest MOVE, COMPUTE, ADD, SET, and IF.

In another embodiment in accordance with the present invention, statements of interest are identified using a COBOL parser, a software component that analyzes the source code of a computer programming language to create a form of internal representation, by reusing the source code from compiler 126 to do the parsing.

Debugger validation program 124 generates a debug command file (step 206). Responsive to scanning source program files 130, debugger validation program 124 automatically generates a debug command file based on source program files 130 that are scanned. A debug command file is a text file made up of a series of debug commands to be read and executed by debugger program 128. FIG. 5B depicts an example of a debug command file, generated from the COBOL source program file in FIG. 5A, for validating the correctness of the MOVE, COMPUTE, ADD, and SET commands in debugger program 128. FIG. 5D depicts an example of a debug command file, generated from the COBOL source program file in FIG. 5A, for validating the correctness of the IF command in debugger program 128. In one embodiment in accordance with the present invention, if there are changes to source program files 130, then the corresponding debug command file is automatically regenerated to reflect that change. In another embodiment, compiler 126 can generate the debug command file based on source program files 130 that are scanned.

Debugger validation program 124 generates debug commands and inserts the debug commands into the debug command file for each statement of interest found in step 204 (step 208). In one embodiment, debugger validation program 124 gathers information to use when generating debug commands for each statement of interest found in step 204. For example, information for each statement of interest may include: the full statement of interest text, the location of the statement of interest within the source file (line/statement number); the location of the statement immediately following the statement of interest (regardless of whether or not that next statement is also a statement of interest); the location of the first statement within the true path, and false path for an IF statement; taking into account nested IF statements (described in more detail below); and the name of the receiving variable in an assignment statement, or the sub-expression which denotes the target of the assignment which may involve member access, array indexing, pointer dereferencing, and arithmetic, among other operations.

Debugger validation program 124 inserts the appropriate set of debug commands for each statement of interest in order to achieve the desired behavior during the baseline and test runs (discussed below). Responsive to inserting the generated debug commands into the debug command file, the result is one command file containing debug commands for each statement of interest that is conditioned to execute a different set of commands during a baseline run and a test run. The debug commands set breakpoints, evaluate expressions, list the values of receiving variables (or sub-expressions), change the debuggable program resume point, and let the debuggable program run, among other things.

In another embodiment, debugger validation program 124 generates two separate debug command files, one for a baseline run and one for a test run, each with the commands appropriate for the type of run being done. Debugger validation program 124 passes the baseline command file to debugger program 128 during a baseline run, and the test command file to debugger program 128 during a test run. In the same embodiment, it is not required to generate and insert debug commands, which are conditioned to cause a different set of commands to be executed during a baseline run and a test run, into the debug command file.

Debugger validation program 124 causes debugger program 128 to execute a baseline run of the debuggable program (step 210). The debug command file contains logic for debugger program 128 to perform certain steps during a baseline run, in which the compiler-generated code executes the statements containing the expressions of interest that are found in source program files 130. In one embodiment, debugger validation program 124 prepends two additional debug commands to the debug command file, prior to causing the execution of a baseline run. The two additional debug commands define a debugger session variable, and set the debugger session variable to a value which indicates that a baseline run is being executed. A session variable is a variable that is defined using the debugger command language, that exists only during the debug session in which the session variable is defined, and that may be referenced in subsequent commands within the debug command file.

As a result of the execution of the baseline run, a debug log file is output which shows the value of each receiving variable in each statement of interest, as depicted in FIG. 5C. In one embodiment, the receiving variable value in the baseline log is calculated and stored by the compiler-generated code in the debuggable program. For example, the COBOL statements MOVE, SET, and COMPUTE each assign a resulting value into a variable when the compiler-generated code for those statements is executed. A detailed flowchart of step 210 is discussed below with reference to FIG. 3A. The COBOL statement IF is a conditional statement which does not assign a value to a receiving variable, and requires a different method to display the results of a baseline and test run (discussed below with reference to FIGS. 3C and 3D).

Debugger validation program 124 causes debugger program 128 to execute a test run (step 212). During the test run, the debug command file is run a second time in the debugger, and executes the test run path that was generated within the debug command file. The debug command file contains logic for debugger program 128 to perform certain steps during a test run, in which the debugger executes a command which mimics the statement containing the expressions of interest from source program files 130. As a result of the execution of the test run, a debug log file is output which shows the value of each receiving variable in each statement of interest, as depicted in FIG. 5C. In one embodiment, the receiving variable value in the test run log is calculated and stored by debugger program 128. A detailed flowchart of step 212 is discussed below with reference to FIG. 3B.

Debugger validation program 124 compares the baseline log to the test log and reports any differences between the logs (step 214). In an embodiment in accordance with the present invention, debugger validation program 124 uses an automated process to compare the receiving variable values of the baseline and test run output logs to detect any differences between the values. Any differences that exist between the output logs are reported as a test case failure. If the two logs are equal, the compiler-generated code (baseline run) and debugger program 128 (test run) achieved the same results and the test case is considered a pass. A difference in the baseline and test run output logs indicates that there are one or more defects in the debugger support for expression evaluation that need to be corrected. For example, as depicted in FIG. 5C, the values in the debug log files for the baseline run and test run are the same, indicating that the debug commands arrived at the same answer as the compiler-generated code for the statements of interest.

Figure 3A:
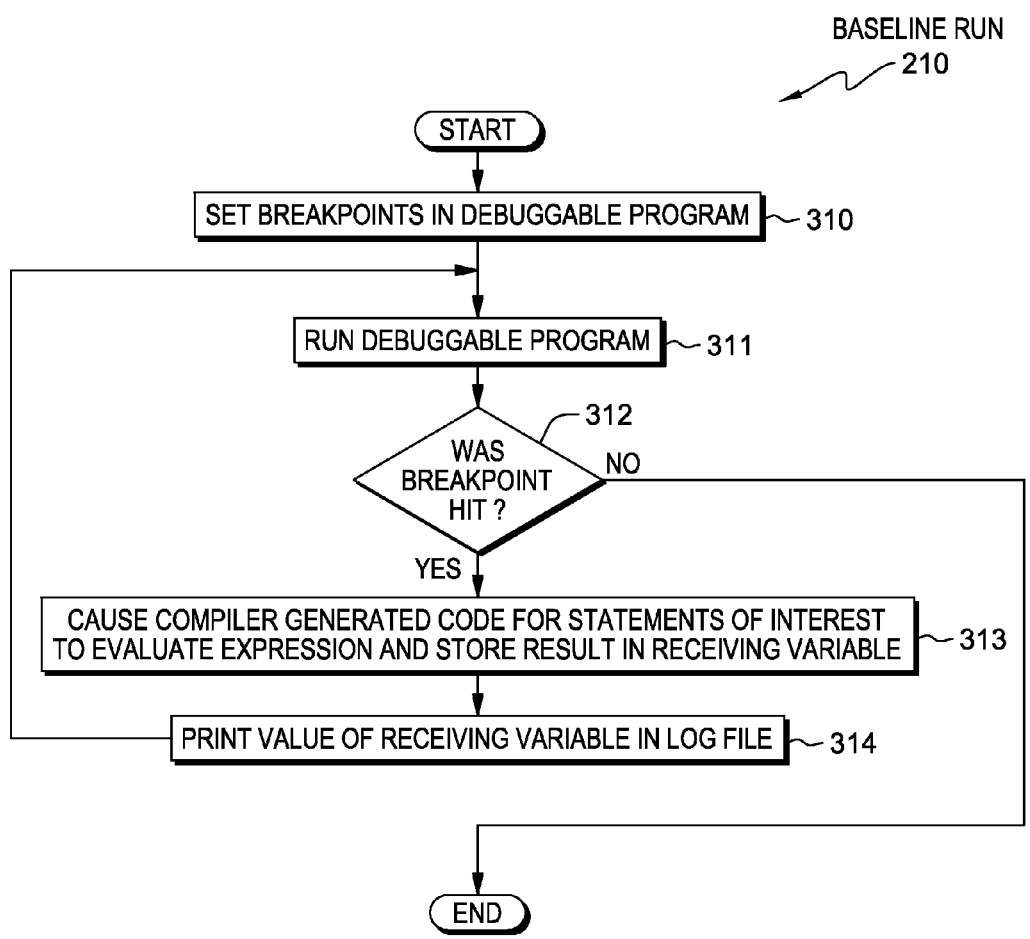
FIG. 3A is a flowchart depicting operational steps of a debugger program for executing a baseline run using debug commands generated from assignment statements in a debuggable program, in accordance with an embodiment of the present invention.

FIG. 3A is a flowchart depicting the operational steps of debugger program 128 for executing a baseline run using debug commands generated from assignment statements in a debuggable program, in accordance with an embodiment of the present invention.

Debugger program 128 sets breakpoints at specific locations in the debuggable program, relative to the statements of interest (step 310). A breakpoint is an intentional stopping or pausing place in a computer program. In one embodiment, debugger program 128 sets breakpoints on the statements immediately following each statement of interest. For example, a breakpoint is set for the statements following each MOVE, SET, or COMPUTE statement in COBOL programming language.

Debugger program 128 causes the debuggable program to run (step 311). Debugger program 128 executes the debuggable program by running the compiler-generated code until a breakpoint is hit after a statement of interest.

Debugger program 128 determines whether a breakpoint was hit in the debuggable program (decision block 312). If a breakpoint was not hit (decision block 312, No branch), debugger program 128 stops running and the program exits. If a breakpoint was hit (decision block 312, Yes branch), debugger program 128 causes the compiler-generated code to evaluate the expression and to store the results (step 313).

Debugger program 128 causes the compiler-generated code for a statement of interest to perform expression evaluation and to store the result in a receiving variable (step 313). In one embodiment, debugger program 128 automatically executes the compiler-generated code to perform expression evaluation for a statement of interest, once the statement of interest is reached in the program. For example, at the time the set breakpoint has been reached, the compiler-generated code to evaluate the MOVE, SET, or COMPUTE statement that immediately precedes the breakpoint will have already been executed. As a result of the compiler-generated code performing expression evaluation, the resulting value is stored in a receiving variable.

Debugger program 128 prints the value of the receiving variable in a log file (step 314). Responsive to the compiler-generated code performing expression evaluation, the resulting stored value of the receiving variable is displayed in a log file. Once debugger program 128 has stopped running, a log file containing the values of each receiving variable for each statement of interest will be printed (depicted in FIG. 5C). In one embodiment, the resulting value is written into a baseline log file. For example, when using Debug Tool, a commercial debugger product, as a debugger, the LIST command writes the resulting values into a log file.

Optionally, the generated debug command file can list the values of the variables using only hexadecimal digits without any additional formatting. Listing the raw, unformatted storage value in this way aids in catching errors in debugger program 128 support that may not be evident when using formatted values alone. For example, for some COBOL data types there is more than one way to represent the sign of a value (positive or negative), and if debugger program 128 uses a different representation than compiler 126, this may result in discrepancies that would not be evident unless the raw, unformatted value of the storage is printed in the log files, showing a difference in the internal sign representation.

Debugger program 128 continues to cause the debuggable program to run (step 311) until another breakpoint is hit (decision block 312, Yes branch), or there are no more breakpoints and the program exits (decision block 312, No branch).

Figure 3B:
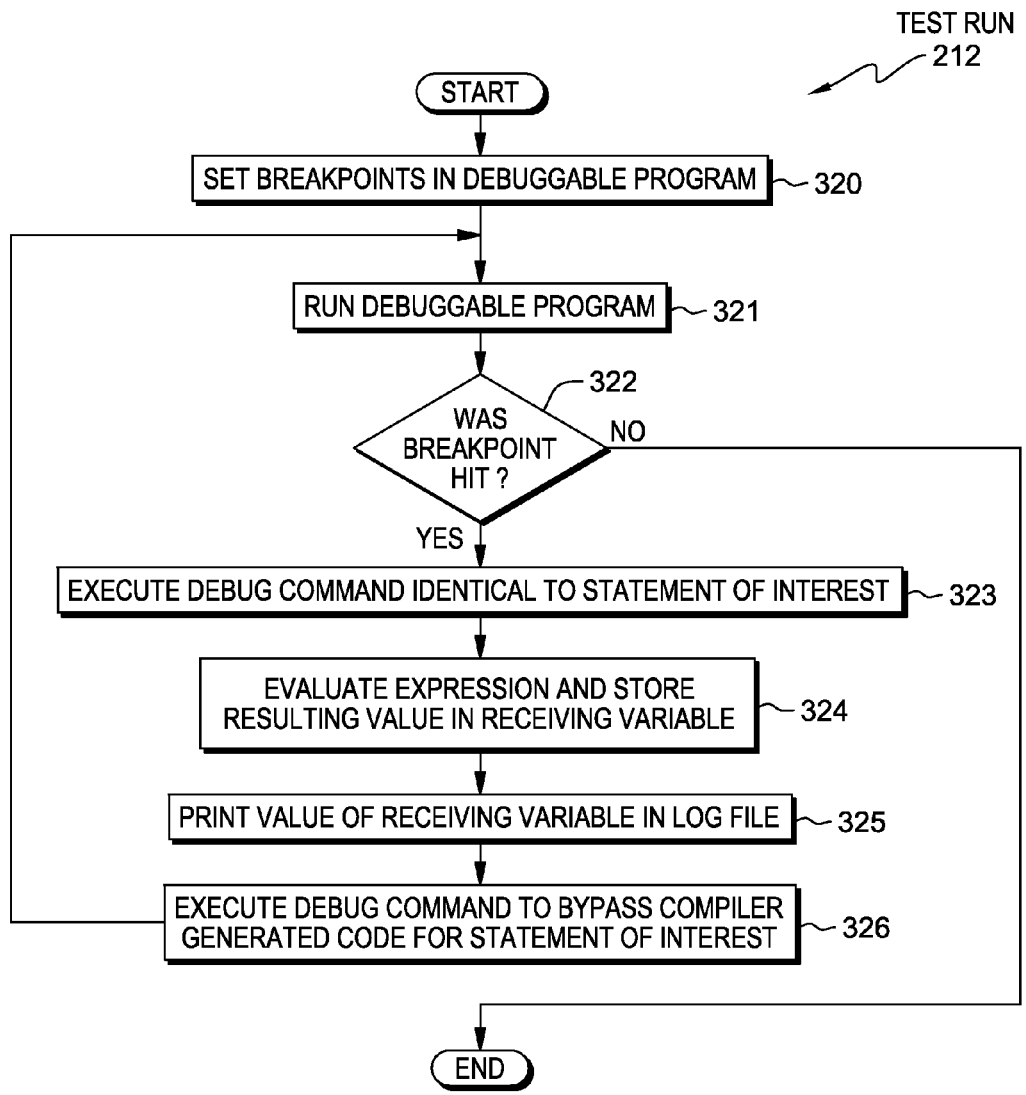
FIG. 3B is a flowchart depicting operational steps of a debugger program for executing a test run using debug commands generated from assignment statements in a debuggable program, in accordance with an embodiment of the present invention.

FIG. 3B is a flowchart depicting the operational steps of debugger program 128 for executing a test run (step 212) using debug commands generated from assignment statements in a debuggable program, in accordance with an embodiment of the present invention.

Debugger program 128 sets breakpoints at specific locations in the program, relative to the statements of interest (step 320). In one embodiment, debugger program 128 sets a breakpoint on every statement of interest. For example, a breakpoint is set on every MOVE, SET, or COMPUTE statement in a COBOL programming language program.

Figure 4:
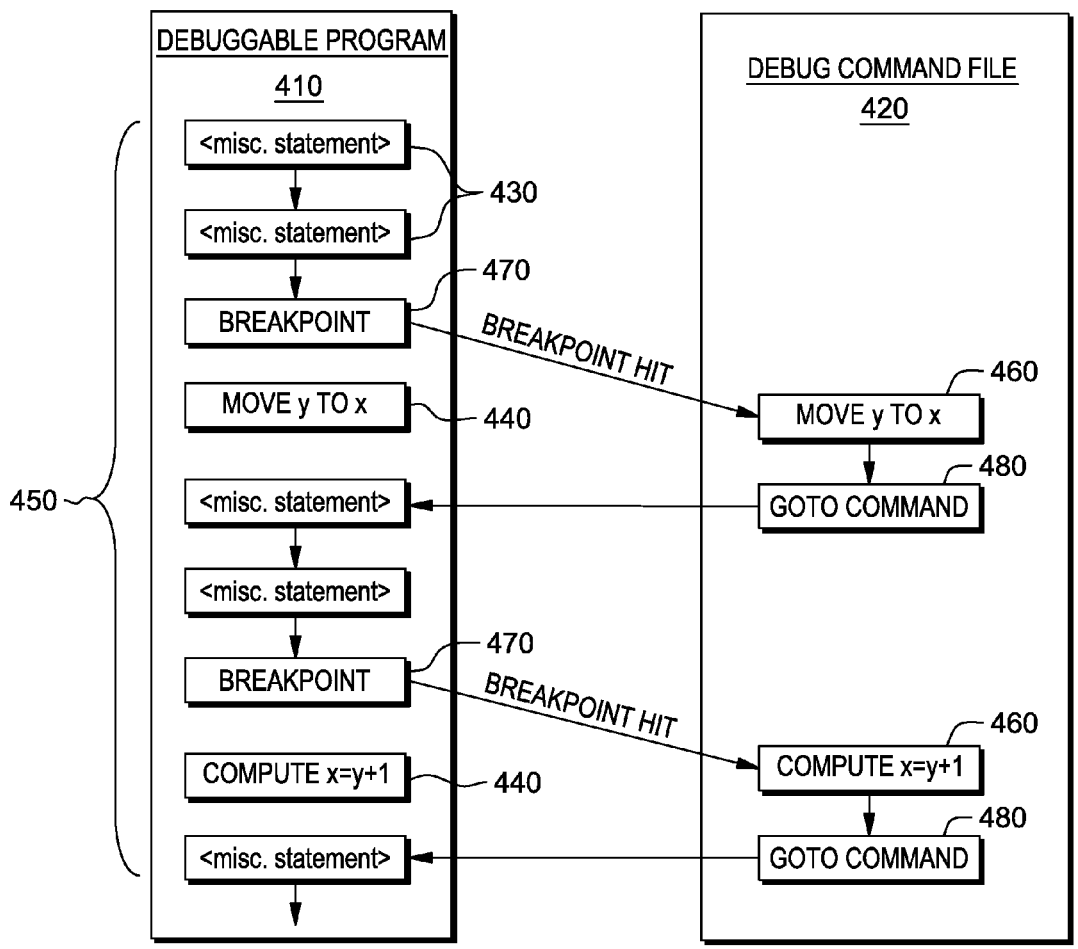
FIG. 4 illustrates a representation of the interleaving of the debuggable program flow when executing a test run using debug commands generated from assignment statements in a debuggable program, in accordance with an embodiment of the present invention.

Debugger program 128 causes the debuggable program to run (step 321). Debugger program 128 executes the debuggable program by running the compiler-generated code, until a breakpoint is hit at a statement of interest, but does not execute the statement of interest. For example, as depicted in FIG. 4, debuggable program 410 is executed by running the compiler-generated code 450 for miscellaneous (misc.) statements 430 (statements that are not of interest), until breakpoint 470 is reached, right before statement of interest 440.

Debugger program 128 determines whether a breakpoint was hit in the debuggable program (decision block 322). If a breakpoint was not hit (decision block 322, No branch), then debugger program 128 stops running and the program exits. If a breakpoint was hit (decision block 322, Yes branch), then debugger program 128 executes a debug command, identical to the statement of interest (step 323).

Debugger program 128 executes a debug command that is identical to the statement of interest (step 323). In one embodiment, responsive to hitting a breakpoint at a statement of interest in the compiler-generated code, debugger program 128 automatically executes a debug command that is identical to the statement of interest in the debuggable program. For example, as depicted in FIG. 4, debugger program 128 executes debug command 460 "MOVE y TO x" in debug command file 420 that is identical to statement of interest 440 "MOVE y TO x" in debuggable program 410.

Debugger program 128 performs expression evaluation and stores the resulting value in a receiving variable (step 324). In one embodiment, debugger program 128 automatically performs expression evaluation on the debug command that is identical to the statement of interest in the debuggable program, emulating the expression evaluation the compiler-generated code would have performed for this statement.

Responsive to debugger program 128 performing expression evaluation on the statement of interest, the resulting value is stored in a receiving variable.

Debugger program 128 prints the value of the receiving variable in a log file (step 325). Responsive to debugger program 128 performing expression evaluation, debugger program 128 displays the stored value of the receiving variable in a log file. Once debugger program 128 has stopped running, a log file containing the values of each receiving variable for each statement of interest will be printed (depicted in FIG. 5C). In one embodiment, the resulting value is written into a test log file. For example, when using Debug Tool as a debugger, the LIST command writes the resulting values into a log file.

Debugger program 128 executes a debug command to bypass the compiler-generated code for a statement of interest in the debuggable program (step 326). In one embodiment, debugger program 128 executes a command to bypass the statement of interest in the debuggable program to ensure that the expression is evaluated only one time by the debugger, and not a second time by the compiler-generated code in the debuggable program. For example, as depicted in FIG. 4, before allowing debuggable program 410 to continue running, debugger program 128 executes GOTO command 480 to bypass statement of interest 440 "MOVE y TO x" in debuggable program 410, as an equivalent debug command 460 "MOVE y TO x" was evaluated by debugger program 128. Allowing the expression to be evaluated again by the compiler-generated code, can have undesirable side effects.

Debugger program 128 continues to cause the debuggable program to run (step 321) until another breakpoint is hit (decision block 322, Yes branch) or there are no more breakpoints and the program exits (decision block 322, No branch).

Figure 3C:
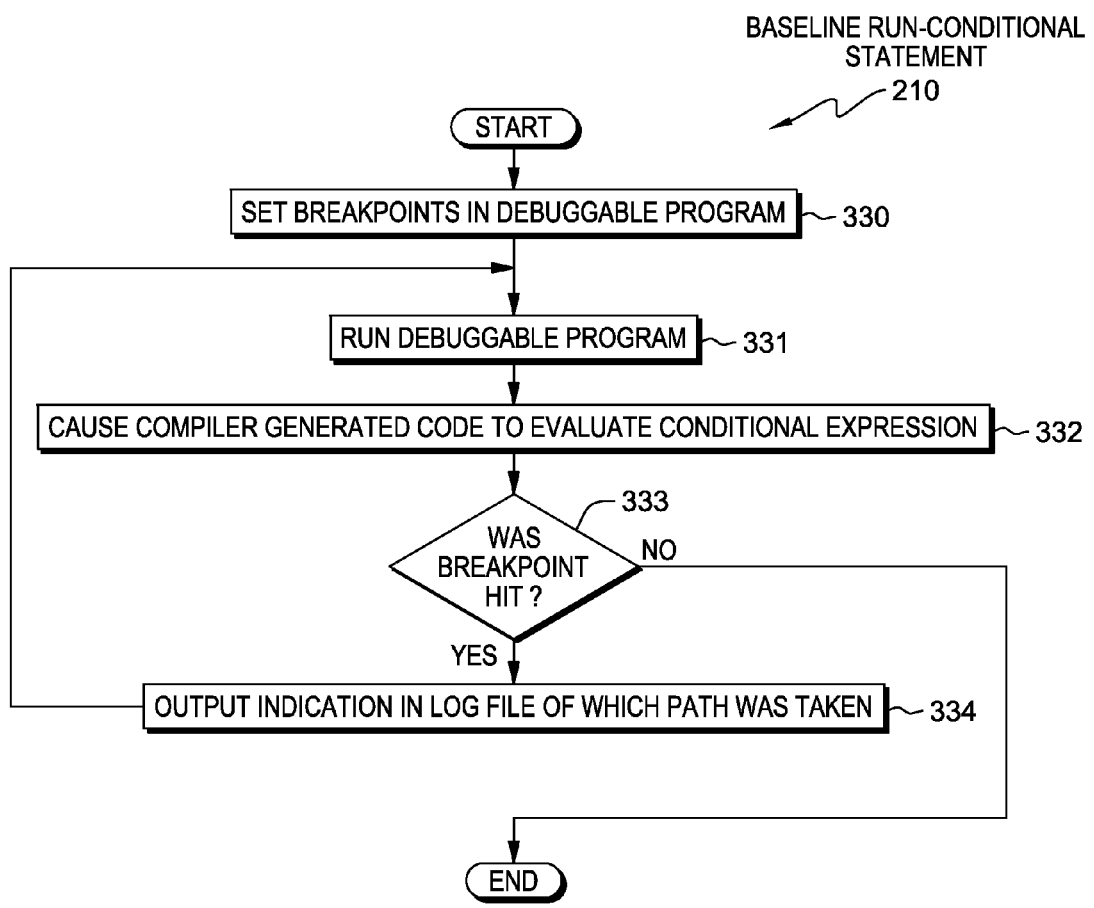
FIG. 3C is a flowchart depicting operational steps of a debugger program for executing a baseline run using debug commands generated from IF statements in a debuggable program, in accordance with an embodiment of the present invention.

FIG. 3C is a flowchart depicting operational steps of debugger program 128 for executing a baseline run (step 210) using debug commands generated from IF statements in a debuggable program, in accordance with an embodiment of the present invention.

Debugger program 128 sets breakpoints at specific locations in the program, relative to the statements of interest (step 330). In one embodiment, debugger program 128 sets breakpoints in the debuggable program at the first statement within the true path of an IF statement and the first statement within the false path, if there is a false path. For example, in COBOL programming language, the IF statement has a conditional expression that is evaluated. The set of statements between the IF and the matching ELSE (or matching END-IF when there is no ELSE) are referred to as the true path because these are the statements that will be executed when the condition evaluates to true. When there is an associated ELSE, the set of statements between the ELSE and the corresponding END-IF are referred to as the false path because these are the statements that will be executed when the condition evaluates to false. Debugger program 128 sets breakpoints on the first statement within these paths for all IF statements in the debuggable program, including nested ones.

Debugger program 128 causes the debuggable program to run (step 331). In one embodiment, the compiler-generated code evaluates the conditional expression in the statement of interest, prior to reaching the set breakpoint. For example, by executing the debuggable program, debugger program 128 causes the compiler-generated code to evaluate the conditional expression in the IF statement, before the debuggable program reaches the set breakpoint in the true or false path.

Debugger program 128 causes the compiler-generated code for a statement of interest to evaluate the conditional expression (step 332). In one embodiment, debugger program 128 automatically executes the compiler-generated code to perform expression evaluation for a statement of interest, once the statement of interest is reached in the debuggable program.

Debugger program 128 determines whether a breakpoint was hit in the debuggable program (decision block 333). If a breakpoint was not hit (decision block 333, No branch), debugger program 128 stops running and the program exits. If a breakpoint was hit (decision block 333, Yes branch), debugger program 128 outputs an indication in a log file of which path was taken (step 334).

Debugger program 128 outputs an indication in a log file of which path was taken (step 334). In one embodiment, a LIST command is used to output an indication in a log file of whether the true path (condition evaluated as true) or the false path (condition evaluated as false) was taken, responsive to debugger program 128 hitting a set breakpoint. For example, as depicted in FIG. 5E, the compiler-generated code for the conditional expression in the IF statement produced a result of true.

Debugger program 128 continues to cause the debuggable program to run (step 331) until another breakpoint is hit (decision block 333, Yes branch) or there are no more breakpoints and the program exits (decision block 333, No branch).

Figure 3D:
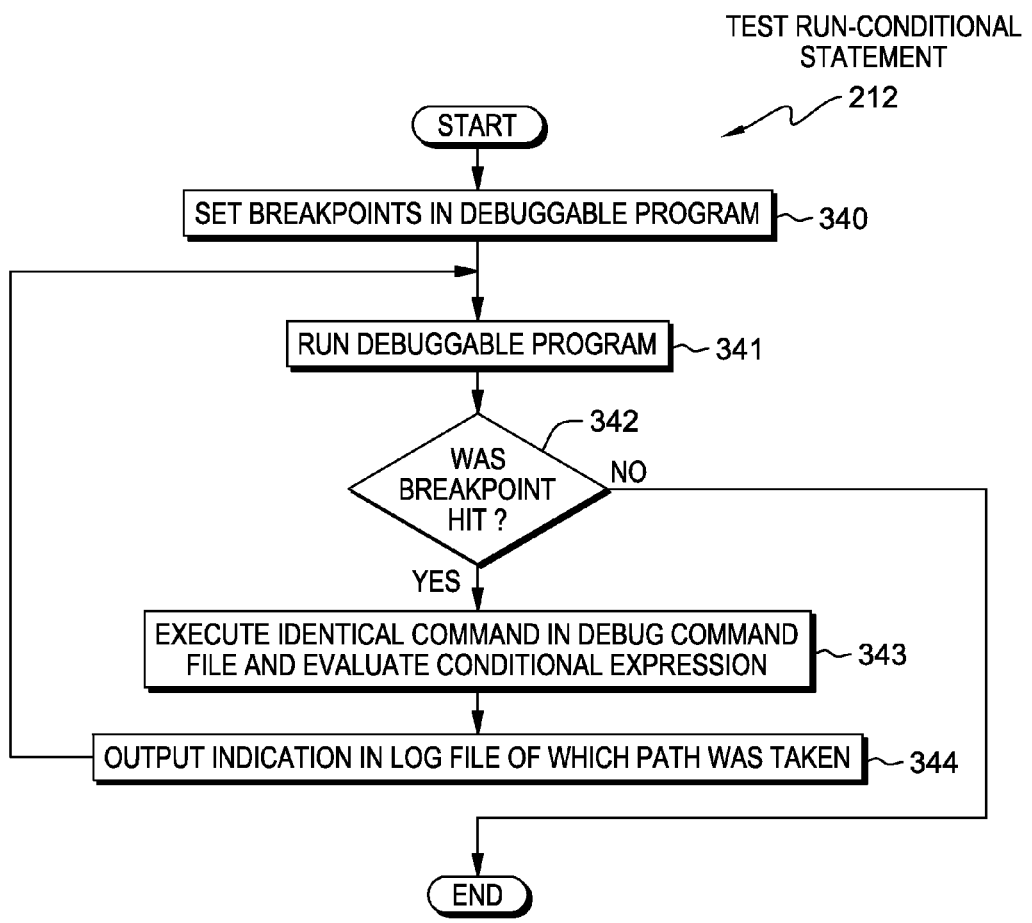
FIG. 3D is a flowchart depicting operational steps of a debugger program for executing a test run using debug commands generated from IF statements in a debuggable program, in accordance with an embodiment of the present invention.

FIG. 3D is a flowchart depicting operational steps of debugger program 128 for executing a test run (step 212) using debug commands generated from IF statements in a debuggable program, in accordance with an embodiment of the present invention.

Debugger program 128 sets breakpoints at specific locations in the program, relative to the statements of interest (step 340). In one embodiment, debugger program 128 sets breakpoints at each IF statement in a debuggable program. For example, a breakpoint is set at each IF statement in the debuggable program in COBOL programming language.

Debugger program 128 causes the debuggable program to run (step 341). Debugger program 128 executes the debuggable program by running the compiler-generated code until a breakpoint is hit.

Debugger program 128 determines whether a breakpoint was hit in the debuggable program (decision block 342). If a breakpoint was not hit (decision block 342, No branch), then debugger program 128 stops running and the program exits. If a breakpoint was hit (decision block 342, Yes branch), then debugger program 128 executes an identical IF command in the debug command file and evaluates the conditional expression associated with the identical IF command (step 343).

Debugger program 128 executes an identical IF command in the debug command file and evaluates the conditional expression associated with that command (step 343). In one embodiment, responsive to hitting a breakpoint in the debuggable program, debugger program 128 automatically executes an IF command in the debug command file that is identical to the IF statement that was executed by the compiler-generated code during the baseline run, and debugger program 128 evaluates the identical conditional expression associated with that command.

Debugger program 128 outputs an indication in a log file of which path was taken within the debug command file, as a result of evaluating the conditional expression in the IF command (step 344). In one embodiment, a LIST command is used to output an indication in a log file of whether the true path (condition evaluated as true) or the false path (condition evaluated as false) of the IF command was taken. The true path output string for the test run is identical to the true path output string of the baseline run, and the false path output string for the test run is identical to the false path output string of the baseline run. For example, as depicted in FIG. 5E, the evaluation of the conditional IF statement by debugger program 128 (test run) produced a result of true. A comparison of the output strings of the baseline run and the test run will indicate whether debugger program 128 evaluated the conditional expression properly (baseline and test run outputs are identical), or if there was an error (baseline and test run outputs are different). For example, as depicted in FIG. 5E, both the compiler-generated code (baseline run) and debugger program 128 (test run) arrived at the same output results for the statement of interest.

Debugger program 128 continues to cause the debuggable program to run the compiler-generated code (step 341) until another breakpoint is hit (decision block 342, Yes branch) or there are no more breakpoints and the program exits (decision block 342, No branch). In one embodiment, debugger program 128 causes the debuggable program to run the compiler-generated code (step 341) and debugger program 128 causes the compiler-generated code to execute the IF statement that was executed in the debug command file in step 343, causing the debuggable program to follow the true path or the false path (if there is one).

In an embodiment, debugger program 128 causes the compiler-generated code to evaluate the conditional expression that was evaluated by debugger program 128 in step 343, so that the conditional expression is evaluated twice; one time by debugger program 128, and a second time by the compiler-generated code in the debuggable program. In another embodiment, debugger program 128 causes the evaluation of the conditional expression in the debuggable program to be bypassed and only executed one time by debugger program 128. For example, in a language where conditional expressions may be non-idempotent (such as C), evaluating an expression twice may have undesirable side effects that would negatively impact the remaining execution of the debuggable program. To evaluate an expression one time, debugger program 128 executes a GOTO command so that when execution of the debuggable program resumes, it will be correctly positioned at the first statement within the true path of the IF statement, the first statement of the false path of the IF statement (if there is one), or the first statement after the corresponding END-IF.

Figure 6:
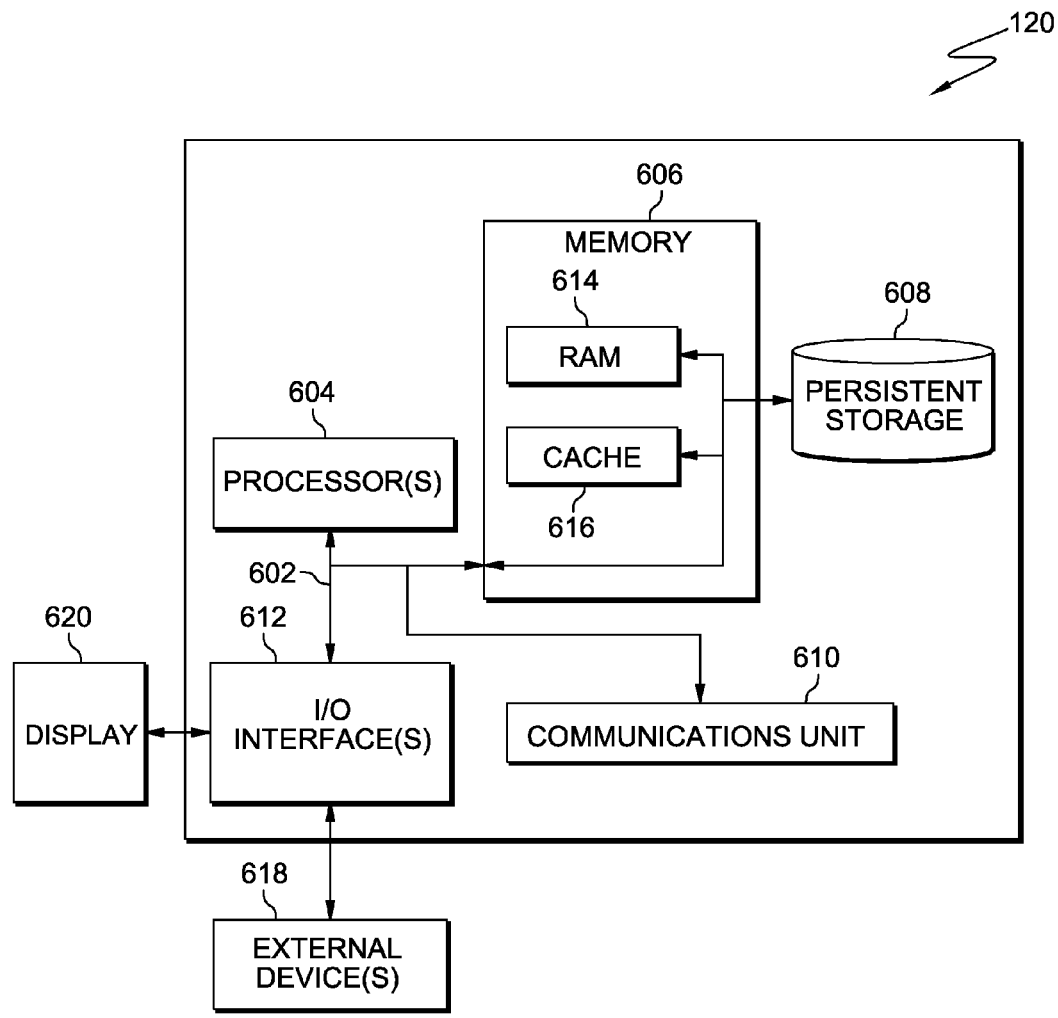
FIG. 6 depicts a block diagram of internal and external components of a data processing system, such as the computing device of FIG. 1, in accordance with an embodiment of the present invention.

FIG. 6 depicts a block diagram of components of computing device 120, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computing device 120 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer readable storage media. In this embodiment, memory 606 includes random access memory (RAM) 614 and cache memory 616. In general, memory 606 can include any suitable volatile or non-volatile computer readable storage media.

User interface 122, debugger validation program 124, compiler 126, debugger program 128, and source program files 130 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer readable storage medium that is also part of persistent storage 608.

Communications unit 610, in these examples, provides for communications with other data processing systems or devices. In these examples, communications unit 610 includes one or more network interface cards. Communications unit 610 may provide communications through the use of either or both physical and wireless communications links. User interface 122, debugger validation program 124, compiler 126, debugger program 128, and source program files 130 may be downloaded to persistent storage 608 through communications unit 610.

I/O interface(s) 612 allows for input and output of data with other devices that may be connected to computing device 120. For example, I/O interface 612 may provide a connection to external devices 618 such as a keyboard, keypad, a touch screen, and/or some other suitable input device. External devices 618 can also include portable computer readable storage media such as, for example, thumb drives, portable optical or magnetic disks, and memory cards. Software and data used to practice embodiments of the present invention, e.g., user interface 122, debugger validation program 124, compiler 126, debugger program 128, and source program files 130, can be stored on such portable computer readable storage media and can be loaded onto persistent storage 608 via I/O interface(s) 612. I/O interface(s) 612 also connect to a display 620. Display 620 provides a mechanism to display data to a user and may be, for example, a computer monitor or an incorporated display screen, such as is used in tablet computers and smart phones.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for validating correctness of expression evaluation within a debugger program, the method comprising:
   determining, by one or more processors, a statement of interest within one or more source program files of a debuggable program, wherein the statement of interest comprises an expression recognized by a debugger program;
   generating, by one or more processors, a debug command file for the statement of interest;
   inserting, by one or more processors, a set of debug commands for the statement of interest into the debug command file, wherein the set of debug commands comprises a first path for a baseline run and a second path for a test run;
   causing, by one or more processors, the execution of the baseline run and the test run;
   comparing, by one or more processors, results from the baseline run and results from the test run to determine if said results from the baseline run are equivalent to said results from the test run;

storing results from the baseline run as a first true path string or a first false path string;

storing results from the test run as a second true path string or a second false path string; and comparing the first true path string or the first false path string of the results from the baseline run to the second true path string or the second false path string of the results from the test run, to determine if the first true path string or the first false path string is equivalent to the second true path string or the second false path string.

2. The method of claim 1, wherein causing, by one or more processors, the execution of the baseline run and the test run further comprises:

storing the results from the baseline run in a baseline log; and storing the results from the test run in a test log.

3. The method of claim 1, wherein the step of comparing, by the one or more processors, results from the baseline run and results from the test run to determine if said results from the baseline run are equivalent to said results from the test run further comprises:

storing results from the baseline run as a first plurality of values of receiving variables;

storing results from the test run as a second plurality of values of receiving variables; and comparing the first plurality of values of receiving variables of the results from the baseline run to the second plurality of values of receiving variables of the results from the test run, to determine if the first plurality of values are equivalent to the second plurality of values.

4. The method of claim 1, wherein inserting the set of debug commands that comprises the first path for the baseline run further comprises:

inserting a command to set a first breakpoint at a statement after the statement of interest in the debuggable program, wherein the debuggable program is generated from the one or more source program files;

inserting a command to execute the debuggable program; and inserting a command, in response to the debuggable program hitting the first breakpoint, to list a value of a receiving variable, associated with a result of the expression within the statement of interest, in a baseline log.

5. The method of claim 1, wherein inserting the set of debug commands that comprises the second path for the test run further comprises:

inserting a command to set a second breakpoint at the statement of interest in the debuggable program, wherein the debuggable program is generated from the one or more source program files;

inserting a command to execute the debuggable program;

inserting a command, in response to the debuggable program hitting the second breakpoint, to execute a debug command substantially identical to the statement of interest;

inserting a command to list a value of a receiving variable associated with a result of the execution of the debug command that is substantially identical to the statement of interest, in a test log;

inserting a command to bypass the statement of interest in the debuggable program; and inserting a command to resume execution of the debuggable program.

6. The method of claim 1, wherein inserting the set of debug commands that comprises the first path for the baseline run further comprises:

inserting a command to set a third breakpoint at a first statement within a true path and a fourth breakpoint at a first statement within a false path, in the debuggable program;

inserting a command to execute the debuggable program;

inserting a command, in response to the debuggable program hitting the third breakpoint, to list an output associated with a true result of a conditional expression within the statement of interest in a baseline log, wherein the output comprises a true path string; and inserting a command, in response to the debuggable program hitting the fourth breakpoint, to list an output associated with a false result of the conditional expression in a baseline log, wherein the output comprises a false path string.

7. The method of claim 1, wherein inserting the set of debug commands that comprises the second path for the test run further comprises:

inserting a command to set a fifth breakpoint at the statement of interest, wherein the statement of interest contains a conditional expression, in the debuggable program;

inserting a command to execute the debuggable program;

inserting a command, in response to the debuggable program hitting the fifth breakpoint, to execute a debug command substantially identical to the statement of interest containing the conditional expression;

inserting a command to list an output associated with a true result of the debug command substantially identical to the statement of interest containing the conditional expression in a test log, wherein the output comprises a true path string; and inserting a command to list an output associated with a false result of the debug command substantially identical to the statement of interest containing the conditional expression in a test log, wherein the output comprises a false path string.

* * * * *